(12) United States Patent
Landsmann et al.

(10) Patent No.: US 11,456,687 B2
(45) Date of Patent: Sep. 27, 2022

(54) METHOD AND DEVICE FOR CONTROLLING A SYNCHRONOUS MACHINE WITHOUT A POSITION SENSOR BY MEANS OF ONE-TO-ONE ASSIGNMENT OF THE ADMITTANCE OR INDUCTANCE TO THE ROTOR POSITION

(71) Applicant: KOSTAL Drives Technology GmbH, Luedenscheid (DE)

(72) Inventors: Peter Landsmann, Munich (DE); Dirk Paulus, Munich (DE); Sascha Kuehl, Munich (DE)

(73) Assignee: KOSTAL DRIVES TECHNOLOGY GMBH, Luedenscheid (DE)

( * ) Notice: Subject to any disclaimer, the term of this patent is extended or adjusted under 35 U.S.C. 154(b) by 121 days.

(21) Appl. No.: 17/177,295

(22) Filed: Feb. 17, 2021

(65) Prior Publication Data

US 2021/0194398 A1   Jun. 24, 2021

Related U.S. Application Data

(63) Continuation of application No. PCT/EP2019/071956, filed on Aug. 15, 2019.

(30) Foreign Application Priority Data

Aug. 17, 2018 (DE) .................... 10 2018 006 547.3
Aug. 22, 2018 (DE) .................... 10 2018 006 657.7

(51) Int. Cl.
*H02P 6/185* (2016.01)
*H02P 21/18* (2016.01)

(52) U.S. Cl.
CPC ............. *H02P 6/185* (2013.01); *H02P 21/18* (2016.02); *H02P 2207/05* (2013.01)

(58) Field of Classification Search
CPC ...... H02P 6/185; H02P 21/18; H02P 2207/05; H02P 21/28; H02P 6/183
(Continued)

(56) References Cited

U.S. PATENT DOCUMENTS 5,559,419 A   9/1996 Jansen et al.
5,796,235 A   8/1998 Schrodl et al.
(Continued)

FOREIGN PATENT DOCUMENTS

DE   102009030884 A1   1/2011
DE   102015217986 A1   3/2017
DE   102016102635 A1   8/2017

OTHER PUBLICATIONS

European Patent Office, International Search Report for corresponding International Application No. PCT/EP2019/071956, dated Nov. 6, 2019.
(Continued)

*Primary Examiner* — David Luo
(74) *Attorney, Agent, or Firm* — Brooks Kushman P.C.

(57) ABSTRACT

A method and a device for assigning the inductance or admittance to the rotor position of a synchronous machine having a stator and a rotor with or without permanent magnets. In operation, the synchronous machine is activated by way of timed terminal voltages and the inductance or admittance is calculated from the terminal voltages and the measured current response. In this case, the variation of the inductance or admittance over the rotor rotation under the boundary condition of an at least two-dimensional current vector that is unchanged in stator coordinates, is used as key information for the positional assignment.

18 Claims, 5 Drawing Sheets

(58) Field of Classification Search
USPC .................................................. 318/700, 652
See application file for complete search history.

(56) References Cited

U.S. PATENT DOCUMENTS

| | | |
|---|---|---|
| 7,190,130 B2 | 3/2007 | Wogari et al. |
| 8,217,605 B2 | 7/2012 | Balazovic et al. |
| 8,228,013 B2 | 7/2012 | Liu et al. |
| 9,188,648 B2 * | 11/2015 | Eskola ............... G01R 27/2611 |
| 2012/0169260 A1 | 7/2012 | Scheit et al. |

OTHER PUBLICATIONS

Electric Machines & Drives Conference, Zhu Z Q et al., "Compensation for Rotor Position Estimation Error due to Cross-Coupling Magnetic Saturation in Signal Injection Based Sensorless Control of PM Brushless AC Motors," 2007, IEMDC 2007, IEEE International, IEEE, Piscataway, NJ., USA, May 1, 2007 (May 1, 2007), pp. 208-213.

2013 IEEE Energy Conversion Congress and Exposition, IEEE, Paulus Dirk et al., "Arbitrary injection for permanent magnet synchronous machines with multiple saliencies," Sep. 15, 2013 (Sep. 15, 2013), pp. 511-517.

\* cited by examiner

METHOD AND DEVICE FOR CONTROLLING A SYNCHRONOUS MACHINE WITHOUT A POSITION SENSOR BY MEANS OF ONE-TO-ONE ASSIGNMENT OF THE ADMITTANCE OR INDUCTANCE TO THE ROTOR POSITION

CROSS-REFERENCE TO RELATED APPLICATIONS

This application is a continuation of International Application No. PCT/EP2019/071956, published in German, with an International filing date of Aug. 15, 2019, which claims priority to DE 10 2018 006 547.3, filed Aug. 17, 2018, and DE 10 2018 006 657.7, filed Aug. 22, 2018, the disclosures of which are hereby incorporated in their entirety by reference herein.

TECHNICAL FIELD

The present invention relates to a method and device for controlling a synchronous machine without a position encoder by means of a clear (i.e., unambiguous) assignment of the admittance or inductance to the rotor position. More particularly, the present invention relates to a method for assigning the inductance or admittance to the rotor position of a synchronous machine having a stator and a rotor with or without permanent magnets, wherein the synchronous machine is actuated via clocked terminal (or clamping) voltages and the inductance or admittance is calculated from these clocked terminal voltages and the measured current response, and to a device for controlling and regulating a polyphase machine configured and designed to carry out such a method.

BACKGROUND

Methods that allow efficient control of a synchronous machine without a position sensor or encoder (often referred to as "sensor-less" control) are divided into two classes:

1. Fundamental wave methods evaluate the voltage induced by movement. At average and high rotational speeds, they provide very good signal properties, but they fail in the lower rotational speed range, in particular when the machine is at a standstill.

2. Anisotropy-based methods evaluate the position dependency of the inductance of the machine, for which reason no rotational speed is necessary. However, they have numerous problems and difficulties, which explains why many applications thus far require a position sensor (with its drawbacks).

Anisotropy-based methods may be further subdivided into two stages. The first stage is anisotropy identification, which calculates the components of the anisotropy vector from the supplied voltage and the resulting current response. Examples of methods involving this stage are provided in bibliography references [1], [2], [3], [4], and [5]. The second stage is rotor position assignment, in which a rotor position is assigned to the measured anisotropy vector. Examples of such are found in bibliography references [6], [7], [8], and [9].

Although anisotropy-based methods have existed since 1988 (bibliography references [1], [10], [11], and [12]), there were no proposals using rotor position assignment until 2004. Saturation and harmonics were ignored, and the measured/calculated anisotropic angle was fed back directly to the control as the rotor position value.

Since 2005 there have been publications that address a load dependency of the anisotropy (bibliography references [7] and [13]). These publications describe, firstly, that the anisotropy orientation shifts relative to the rotor, which from that time forward has been compensated for during operation by means of an appropriate characteristic curve (bibliography references [14], [15], [16], and [17]). Such compensation methods may be regarded as first methods for anisotropic rotor position assignment. The publications also describe that the absolute value of the anisotropy ($L_d$–$L_q$) decreases, as the result of which the position information is reduced or possibly lost.

Since 2007, the anisotropic shift has been additionally described as a function of the rotor position in the form of harmonics (bibliography reference [8]), which from that time forward has been compensated for (bibliography references [18] and [19]) or evaluated (bibliography references [6] and [20]). Both approaches may be regarded as enhanced anisotropic rotor position assignment, and primarily result in improved accuracy.

With regard to the above-described phenomenon of dwindling anisotropy under load, beginning in 2013 approaches have been proposed (bibliography references [9] and [21]) that alter the efficiency- or power-optimal setpoint current trajectories (MTPA, for example) in such a way that critical points with disappearing anisotropy are bypassed. However, such approaches promise only moderate success, since the actual problem is not the disappearance of the anisotropy, but, rather, as explained in bibliography reference [22], a more complex problem that still exists after bypassing the critical points.

The approaches in bibliography references [23], [24], and [25] attempt to overcome this problem by additionally taking into account, based on a conventional rotor position assignment, that the occurrence of an estimation error results (as expected) in application of an incorrect current, and on this basis establishing an estimation error correction rule that shows improved stability properties. However, in these methods as well, the underlying model is not free of the rotor coordinates, which are unknown in estimation mode, and therefore cannot enable a completely unambiguous (i.e., completely clear) rotor position assignment.

SUMMARY

A method for assigning the inductance or admittance to the rotor position of a synchronous machine having a stator and a rotor with or without permanent magnets is presented. The method includes actuating the synchronous machine via clocked terminal voltages. The inductance or admittance is calculated from these clocked terminal voltages and the measured electric current response. In the method, the pattern of the inductance or admittance as a function of the rotor rotation, under the boundary condition of an at least two-dimensional current vector that is unchanged in stator coordinates, is used as key information for the position assignment.

BRIEF DESCRIPTION OF THE DRAWINGS

The following is a general discussion which also pertains to optional embodiments of the present invention. In the Figures.

DETAILED DESCRIPTION

Figure 1:
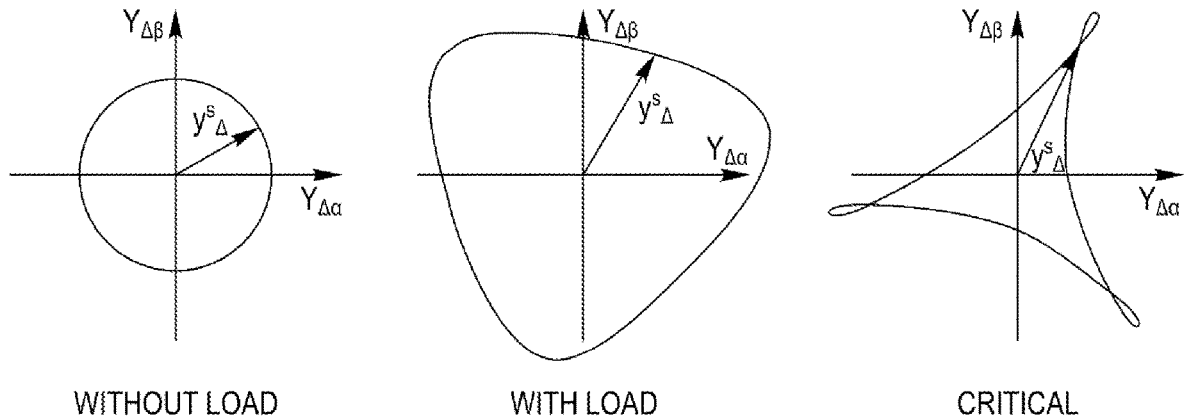
FIG. 1 shows conventional anisotropy trajectories without load (left-side drawing), with load (center drawing), and a critical pattern (right-side drawing), each with an identification of the 0° point (small circle)

Detailed embodiments of the present invention are disclosed herein; however, it is to be understood that the disclosed embodiments are merely exemplary of the present invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "machine" is used here in the sense of an "electric machine," i.e., an electric motor or an electrical generator.

The admittance Y of a synchronous machine, for high-frequency excitation, corresponds approximately to the inverse inductance L; for magnetically anisotropic behavior, both are described as a matrix:

$$Y_s^s \approx L_s^{s-1}. \tag{1}$$

The superscript stands for the coordinate system (KS), in the present case stator coordinates; the subscript describes the variable in greater detail, in the present case, the reference to the variable for the stator winding. The admittance describes the conversion of an exciting voltage vector $\Delta i_s^s$ into an electric current response $\Delta i_s^s$:

$$\Delta i_s^s = Y_s^s u_s^s \Delta t, \tag{2}$$

$$\begin{bmatrix} \Delta i_\alpha \\ \Delta i_\beta \end{bmatrix} = \begin{bmatrix} Y_{\alpha\alpha} & Y_{\alpha\beta} \\ Y_{\beta\alpha} & Y_{\beta\beta} \end{bmatrix} \begin{bmatrix} u_\alpha \\ u_\beta \end{bmatrix} \Delta t, \tag{3}$$

where $\Delta t$ is the time in which the voltage $u_s^s$ was present, and $\Delta i$ is the difference between electric current values $i_s^s$ before and after this time. When the shaft rotates, further interference terms are added in equation (2) which must be compensated for within the scope of the anisotropy identification.

Alternatively, the anisotropy identification may also ascertain the inductance $L_s^s$:

$$u_s^s = L_s^s \frac{\Delta i_s^s}{\Delta t}, \tag{4}$$

which contains anisotropic information and may thus be assigned to a rotor position in a similar manner. However, this derivation takes place using the example of an identified admittance $Y_s^s$.

The objective of the anisotropy identification is to deduce, based on the pattern of the exciting voltage $u_s^s$ (injection, for example) and the resulting electric current response $i_s^s$, the magnetic anisotropy, namely, the so-called anisotropy vector $y_A^s$, whose inputs are a linear combination of certain components of the admittance matrix $Y_s^s$:

$$y_A^s = \begin{bmatrix} y_{\Delta\alpha} \\ y_{\Delta\beta} \end{bmatrix} = \frac{1}{2} \begin{bmatrix} Y_{\alpha\alpha} - Y_{\beta\beta} \\ Y_{\alpha\beta} + Y_{\beta\alpha} \end{bmatrix}. \tag{5}$$

For many machines, this vector $y_A^s$ shows a distinct rotor position dependency. Analogously, two further linear combinations would be possible:

$$Y_\Sigma = \frac{Y_{\alpha\alpha} + Y_{\beta\beta}}{2} \tag{6}$$

$$Y_e = \frac{Y_{\alpha\beta} - Y_{\beta\alpha}}{2}, \tag{7}$$

which, however, from the standpoint of the previous methods do not have sufficient position dependency.

During the rotation of the rotor, the anisotropy vector typically moves on trajectories similar to those in FIG. 1.

The small circle marks the point of each trajectory at the 0° rotor position. The vector $y_A^s$ is situated on a point of the trajectory position at an approximately 10° rotor position and passes through each trajectory twice during each electrical rotor rotation.

A case without load with zero electric current is illustrated on the left in FIG. 1 ("Without load"). The anisotropy is precisely aligned with the rotor, for which reason the 0° point is situated on the $Y_{\Delta\alpha}$ axis. No anisotropic harmonics exist, and therefore the trajectory is circular.

Illustrated in the center in FIG. 1 is a case with high load ("With load"), i.e., an electric current absolute value where the anisotropy alignment is shifted with respect to the rotor position (the 0° point is oblique), and anisotropic harmonics have formed (the trajectory is not circular). For the shift and the harmonics, there are approaches for compensation (bibliography references [18] and [19]) or for utilization (bibliography references [6] and [20]), which in each case have the objective of assigning the corresponding rotor position to the measured anisotropy vector $y_A^s$.

Illustrated on the right in FIG. 1 is a case with a critical pattern ("Critical") of the anisotropy trajectory under load which occurs increasingly with modern machines having concentrated windings. The pattern is critical because multiple rotor positions coincide with one another in the peaks of the trajectory points (ambiguity), and because the pattern essentially stagnates at that location and runs back into itself (low signal component). In addition, for many methods, the fact is critical that the angle of $y_{66}^s$ extends backwards in places (i.e., not monotonically) when passing through the trajectory.

Figure 2:
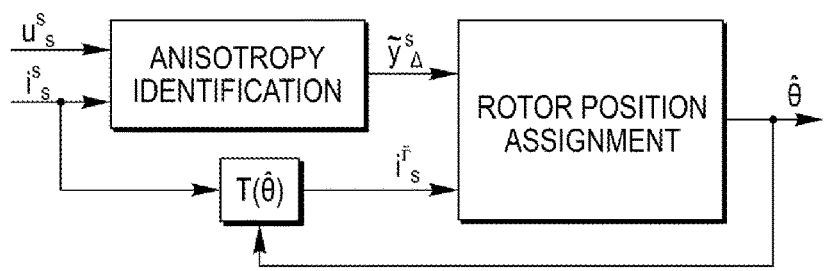
FIG. 2 shows a block diagram of the two-stage design of conventional anisotropy-based methods, with transformation of the electric current into estimated rotor coordinates.

In summary, anisotropy-based methods may be divided into two stages, illustrated in FIG. 2. The first stage is anisotropy identification, which calculates the components of the anisotropy vector from the supplied voltage and the measured electric current response. This anisotropy vector, calculated based on the instantaneous measurement, is referred to as the measured anisotropy vector $\tilde{y}_A^s$, and in contrast to the physical machine property $y_A^s$ contains, for example, typical measurement errors such as noise, etc. The second stage is rotor position assignment, in which an estimated rotor position value $\hat{\theta}$ is assigned to the measured anisotropy vector $\tilde{y}_A^s$.

The second stage of anisotropy-based methods, i.e., the rotor position assignment, under load may result in ambiguity and thus instability of the methods. The reason is that conventional methods for rotor position assignment are directly or indirectly based on the anisotropy trajectories in FIG. 1, which in each case are always valid for a certain electric current in rotor coordinates $i_s^r$. However, during sensor-less operation the rotor coordinates are estimated, as the result of which only the absolute value of the electric current $|i_s^r|=|i_s^s|$ is known by measurement, and the current angle in rotor coordinate $\angle i_s^r$, strictly speaking, is not known.

However, the anisotropy vector $y_A^s$ depends not only on the rotor angle $\theta$ and the electric current absolute value $|i_s^r|$, but in fact also depends on the electric current angle $\angle i_s^r$:

$$y_A^s = f_\angle(\theta, |i_s^r|, \angle i_s^r) \quad (8)$$

Figure 3:
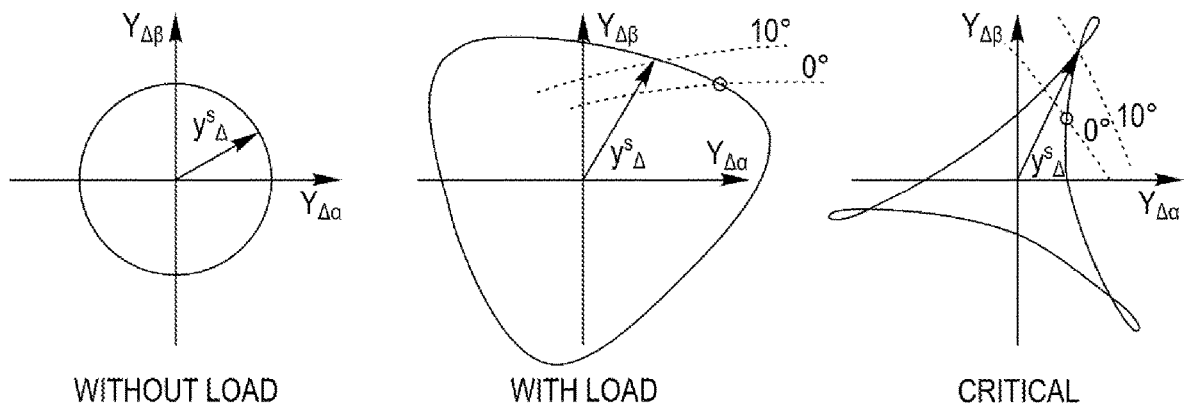
FIG. 3 shows conventional anisotropy trajectories with an electric current angle dependency in a fixed rotor position.

If the electric current angle $\angle i_s^r$ in equation (8) is assumed to be unreliable/erroneous, for a fixed rotor position $\theta$ and a fixed electric current absolute value $|i_s^r|$, this results in the possible locations of the anisotropy vector $y_A^s$ illustrated by dotted lines in FIG. 3. In other words, the dotted-line trajectories result when the electric current angle in rotor coordinates $\angle i_s^r$ is varied in the two operating points described above (0° point and vector $y_A^s$).

With zero electric current (left anisotropy trajectory) the electric current angle is irrelevant, as the result of which the dotted lines are situated at the 0° point or at the peak of $y_A^s$ as circles without a radius, i.e., in the form of a point. A rotor position assignment is unambiguous, even without knowledge of the electric current angle.

Under electric current feed, however, the dotted lines extend similarly to the center and right illustrations in FIG. 3. With increasing electric current absolute value, these lines extend increasingly more strongly in the direction of the course of the anisotropy trajectory, as the result of which an incorrectly applied electric current (due to an estimation error) results in an increasing estimation error. This makes the rotor position assignment ambiguous, and above a certain load limit, unstable.

A method for assigning the inductance or admittance to the rotor position of a synchronous machine, comprising a stator and a rotor with or without permanent magnets, is presented. The synchronous machine is actuated via clocked terminal voltages, and the inductance or admittance is calculated from these clocked terminal voltages and the measured electric current response. In the method, the pattern of the inductance or admittance as a function of the rotor rotation, under the boundary condition of an at least two-dimensional current vector that is unchanged in stator coordinates, is used as key information for the position assignment.

The relationship of equation (8) in principle is not ambiguous. Namely, the problem thus far is due to the fact that the modeling $f_{110}(\bullet)$ takes place in a coordinate system (rotor) whose orientation during sensor-less operation is not known (for example, is constant or directly measurable), and consequently is replaced by an assumption.

The solution of the ambiguity and stability problem now lies in selecting a complete anisotropic model (i.e., one that is a function of angular dimension and at least two current dimensions) whose input variables are all measurable. For this purpose, the electric current vector in stator coordinates $i_s^s$ is used as an input variable:

$$y_A^s = f_s(\theta, i_s^s). \quad (9)$$

The anisotropic model $f_s(\bullet)$ contains the same information as $f_\angle(\bullet)$, and each may be converted into the other via transformation. This time, however, with the exception of $\theta$ (the subsequent calculation result), all variables contained in equation (9) are directly measurable: $i_s^s$ by the electric current sensor system plus fixed Clarke transformation, and $y_A^s$ as $\tilde{y}_A^s$ by anisotropy identification (i.e., electric current measurement and applied voltage).

Figure 4:
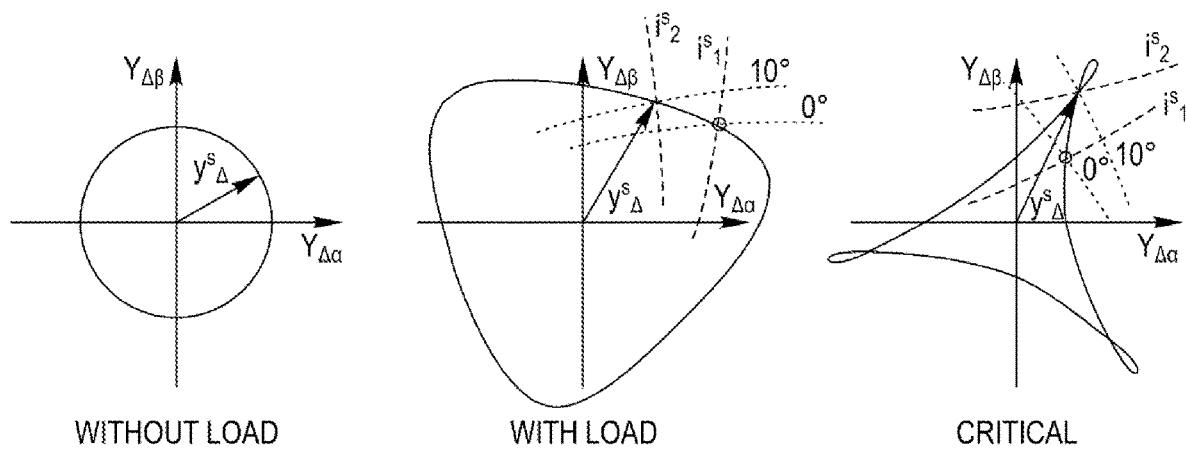
FIG. 4 shows conventional anisotropy trajectories with an electric current angle dependency in a fixed rotor position, and a position dependency under stator-fixed electric current.

The dashed-line trajectories in FIG. 4 illustrate the modeling with $f_s(\bullet)$.

The conventional anisotropy trajectory describes the pattern of the anisotropy for rotor-fixed applied electric current (abbreviated as RFC for rotor-frame fixed electric current), while the dashed lines describe the pattern for stator-fixed applied electric current (abbreviated as SFC for stator-frame fixed electric current). The RFC anisotropy trajectories each show one complete revolution, while of the SFC trajectories, in each case only a section of approximately ±20° about the maximum torque per ampere (MTPA) operating point is illustrated.

Since it is irrelevant whether zero electric current is applied in a rotor-fixed or stator-fixed manner, in the left portion of FIG. 4 ("Without load") the SFC trajectories are identical to the RFC trajectory. The greater the electric current absolute value, the stronger the deviation of the two trajectories from one another. Both trajectories always intersect at the setpoint current point (MTPA, for example), from that point the SFC trajectory extending with ever-greater rotation with increasing electric current absolute value. The unambiguous and stable sensor-less information content that is actually available (not apparent) is present in this rotated direction.

Furthermore, in the right portion of FIG. 4 it is apparent that the ambiguous areas of the critical RFC trajectory are monotonic with consideration of stator-fixed electric current, and thus assume unambiguously assignable patterns.

For obtaining such a model $f_s(\bullet)$, for example magnetic simulation (finite element methods, for example) or a test stand measurement with a position sensor and a load machine are suitable. In the test stand measurement, for example the load machine may rotate the machine to be modeled, while a converter applies a certain SFC $i_1^s$ into the machine to be modeled and an anisotropy identification method continuously calculates/measures the instantaneous anisotropy $\tilde{y}_\Delta^s$. The pattern of the measured anisotropy $\tilde{y}_\Delta^s$ together with the measured rotor position θ is recorded and stored as the anisotropic position relationship that is valid for the SFC $i_1^s$. This sequence is repeated for a plurality of further SFCs $i_2^s$, $i_3^s$ . . . $i_n^s$ until the area of the electric current plane in the stator-fixed coordinate system that is necessary for operation is detected with sufficient resolution.

In some embodiments, for calculating the rotor position, only the measured inductance or admittance, the measured electric current vector in stator coordinates, and the stored position assignment parameters are used, and the estimated rotor position is neither directly nor indirectly returned for the rotor position assignment.

For this purpose, for sensor-less control the model $f_s(\bullet)$ of a machine is inverted in such a way that during operation with injection, a rotor position value θ is assigned to the measured variables $\tilde{y}_\Delta^s$ and $i_s^s$:

$$\hat{\theta} = f'_s(\tilde{y}_\Delta^s, i_s^s). \tag{10}$$

Figure 5:
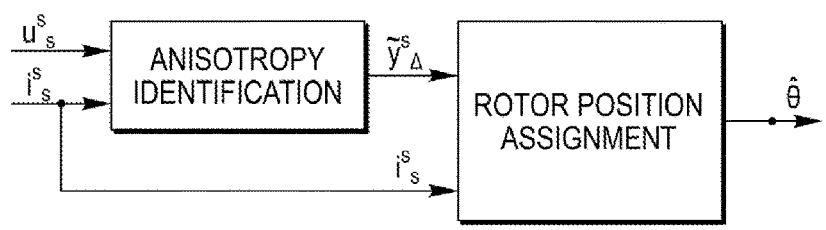
FIG. 5 shows a block diagram of the two-stage design of an anisotropy-based method with SFC (stator-frame fixed electric current) based rotor position assignment, without transformation of the electric current into estimated rotor coordinates.

FIG. 5 shows one embodiment in which via equation (10), linear signal routing results which, in contrast to FIG. 2, has only measured variables as input signals and dispenses with a return of the estimated rotor position.

In some embodiments, multiple patterns of the inductance or admittance as a function of the rotor rotation are stored in or incorporated into a model for various stator-fixed electric current values (set of patterns) in each case, from which an instantaneously valid pattern or parameter set is selected or calculated during operation, according to the electric current measurement, by means of which a rotor position value is assigned to the instantaneously measured inductance or admittance.

Figure 6:
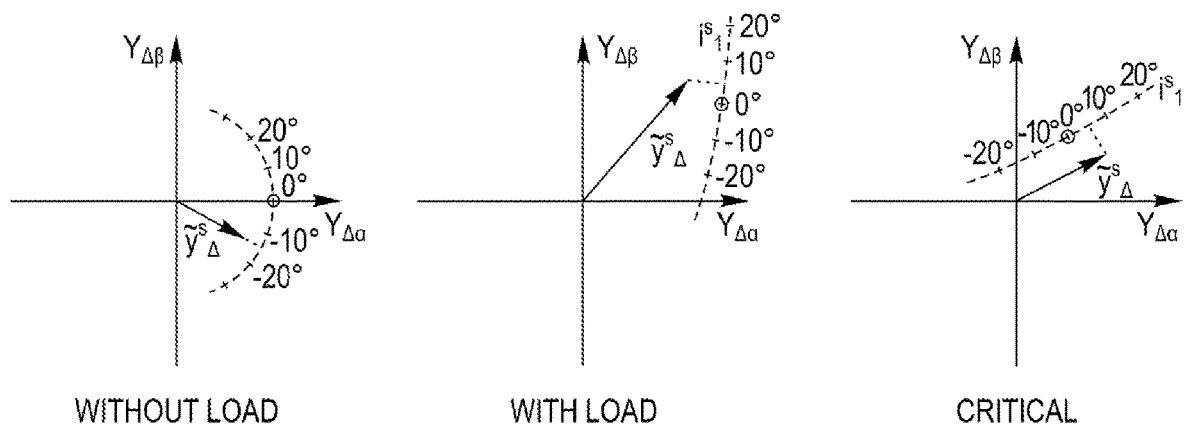
FIG. 6 shows the assignment of a measured anisotropy vector $\tilde{y}_A^s$ to the closest point of the SFC trajectory that is valid for the instantaneously measured electric current vector $i_1^s$, for example.

Such an exemplary embodiment of the rotor position assignment equation (10) during operation is illustrated in FIG. 6 by way of example: first, via the instantaneously measured current $i_1^s$ an unambiguous assignment is made concerning which SEC trajectory of the stored model is valid at that moment (all other trajectories are not illustrated). Each point on this instantaneously valid SFC trajectory corresponds to a rotor position value, which in FIG. 6 is plotted with a 10° grid as an example. The instantaneous measured value $\tilde{y}_\Delta^s$ (result of the anisotropy identification) will be situated near the SFC trajectory due to measurement errors (noise, etc.), and consequently is assigned to a point on the SFC trajectory. An assignment to the closest point is indicated by the dotted lines in FIG. 6 by way of example. Lastly, the associated angular value of the assigned point is ultimately used as the estimated position value θ.

However, the processors that are common in drive technology provide only limited resources with regard to computing power and memory space, of which the sensor-less methods should take up only a small portion so that the other processes are not unduly impaired. Against this background, a complete three-dimensional machine model $f_s(\bullet)$ (over all combinations of α- and β-current and rotor position in the necessary degree of detail/resolution), based on memory considerations, and the above-mentioned search for the closest point, based on computing time considerations, are not always achievable.

Therefore, one objective of the present description is to provide a greatly simplified/reduced model or assignment rule without significantly impairing the estimation quality or stability.

In some embodiments, for example four steps for reducing the resource requirements are possible, which are described separately in the following four sections. The first step pertains to the memory and computing requirements, and the other three steps involve only the memory requirements. Altogether, memory and computing requirements may be achieved that are comparable to the conventional rotor position assignment.

In some embodiments, for assigning the measured inductance or admittance to the rotor position, a linear rule is used which corresponds to a projection of the measured value onto the actual rotor position dependency of the inductance or admittance, which is linearized in the setpoint current working point.

In some embodiments, this corresponds, for example, to a projection of the measured value onto the tangent of the rotor position dependency of the inductance or admittance in the setpoint current working point.

In contrast to RFC trajectories, a complete SFC trajectory $y_\Delta^s(\theta)$ is much larger with a more complex shape and repeats only after one complete electrical revolution (for RFC, after one-half revolution). Its complete description would be possible only by use of many harmonics or a large number of data points. In addition, as described above, the search for the closest point in a parameter-intensive model would require very time-consuming computation.

In contrast, during operation at low rotational speeds (where the anisotropy must be evaluated), the electric current will be present only on or in the area close around the setpoint current trajectory (MTPA or q axis, for example), and the modeling of greatly different electric current angles will be essentially unutilized.

Therefore, for reducing data and computing time, for example each complex SFC trajectory in the setpoint working point is linearized and thus interpreted as a straight line on which the further movement of $y_\Delta^s$ is linear with progressing rotor rotation:

$$y_{\Delta L}^s(\theta) \approx \begin{bmatrix} m_\alpha \\ m_\beta \end{bmatrix} \theta + \begin{bmatrix} Y_{0\alpha} \\ Y_{0\beta} \end{bmatrix}. \tag{11}$$

$$= m_\Delta^s(i_s^s)\theta + y_{\Delta 0}^s(i_s^s). \tag{12}$$

In the setpoint working point, equation (12) describes the magnetic behavior exactly, and also describes how the magnetic behavior changes upon leaving the setpoint working point. However, with increasing distance from the setpoint working point, equation (12) may become inaccurate and sometimes incorrect, but this does not have a direct influence on the accuracy or stability of the estimation.

For example, using this linear approximation of the SFC trajectory equation (9), a very simple rotor position assignment rule may now be established: the position value θ of the closest point results, for example, via vector projection of the measured value $\tilde{y}_\Delta^s$ onto the straight line $y_{\Delta L}^s$:

$$\hat{\theta} = \frac{m_\Delta^{s^T}(\tilde{y}_\Delta^s - y_{\Delta 0}^s)}{m_\Delta^{s^T} m_\Delta^s}. \tag{13}$$

Multiplying a transposed ($x^T$) column vector by a non-transposed column vector essentially corresponds to a scalar product.

Since the measured value $\tilde{y}_\Delta^s = [\tilde{y}_{\Delta\alpha} \ \tilde{y}_{\Delta\beta}]^T$ is the only variable in equation (13), the majority of the multiplications do not have to be computed online:

$$\hat{\theta} = \frac{m_\Delta^{sT}}{m_\Delta^{sT} m_\Delta^s} \tilde{y}_\Delta^s - \frac{m_\Delta^{sT} y_{\Delta 0}^s}{m_\Delta^{sT} m_\Delta^s} \quad (14)$$

$$= \frac{m_\alpha}{m_\alpha^2 + m_\beta^2} \tilde{Y}_{\Delta\alpha} + \frac{m_\beta}{m_\alpha^2 + m_\beta^2} \tilde{Y}_{\Delta\beta} - \frac{m_\alpha Y_{0\alpha} + m_\beta Y_{0\beta}}{m_\alpha^2 + m_\beta^2}. \quad (15)$$

$$= k_\alpha \tilde{Y}_{\Delta\alpha} + k_\beta \tilde{Y}_{\Delta\beta} + k_0. \quad (16)$$

Thus, for the rotor position assignment it is sufficient to store only three coefficients $k_\alpha$, $k_\beta$, and $k_0$ for an SFC, and to offset them with the measured value $\tilde{y}_\Delta^s$ online.

In some embodiments, the position assignment parameters are stored as a function of the current absolute value and the current angle $k_x(i_\parallel, \theta_i)$.

In some embodiments, prior to each further use of the stator-fixed coordinate system, the two anisotropy values of the inductance or admittance are transformed into a coordinate system that is aligned with the double current angle.

For machines with slight to moderate anisotropic harmonics, the SFC trajectories for various current directions have a rotation at twice the electrical frequency. Thus, for example, in the left portion of FIG. 7 the SFC trajectories (in the setpoint working point) for electric current vectors are plotted with equal magnitudes using a 10° electric current angle grid, and consequently repeat after 180°.

Use may be made of this fact for data reduction, for example by transforming the anisotropy vector $y_\Delta^s$ into a double rotating coordinate system in which the anisotropy vector will have much less variation as a function of the rotor rotation. An unambiguously known/measurable angle, not the rotor position, is used for the transformation.

Since the modeling $f_s(\cdot)$ takes place as a function of the electric current vector $i_s^s$ anyway, and the electric current vector in the setpoint working point is fixed in relation to the rotor, for example the double electric current angle is suitable as the basis for the transformation:

$$\theta_i = a\tan 2(i_\beta, i_\alpha) \quad (17)$$

$$y_\Delta^{ii} = \begin{bmatrix} Y_{\Delta x} \\ Y_{\Delta y} \end{bmatrix} = \begin{bmatrix} \cos(2\theta_i) & \sin(2\theta_i) \\ -\sin(2\theta_i) & \cos(2\theta_i) \end{bmatrix} y_\Delta^s. \quad (18)$$

Figure 7:
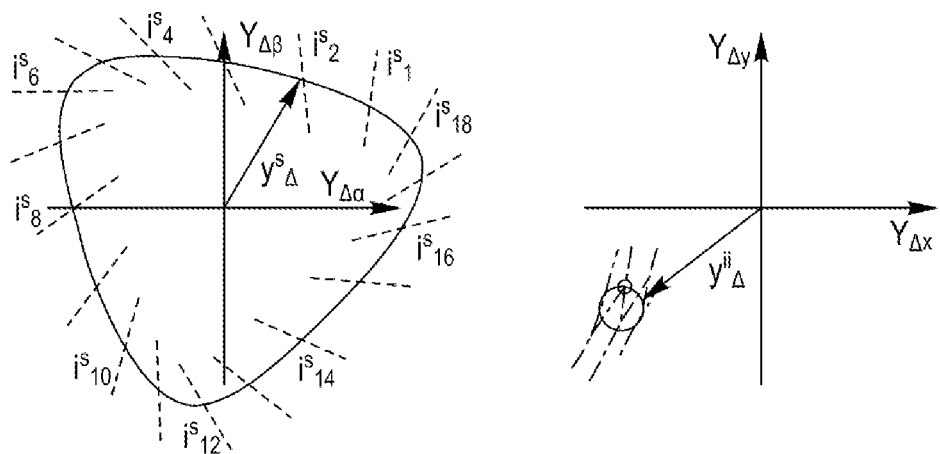
FIG. 7 shows SFC trajectories for all electric current directions in stator coordinates and in double electric current coordinates.

The patterns illustrated in the right portion of FIG. 7 result when the anisotropy vector and the SFC trajectories are represented in these double electric current coordinates according to the exemplary embodiment. These patterns are only relatively similar to one another (despite the moderate strength of the harmonic components of the left curve of FIG. 7), and therefore may also be modeled with less data. Via this transformation, a position assignment is even possible for all electric current directions using only one set of coefficients $k_x$, $k_y$, and $k_0$, depending on the accuracy requirements.

The procedure for calculating these transformed constants is then analogous, for example, to the stator-fixed procedure. For example, first the SFC trajectory is linearized in double electric current coordinates, resulting in the slope $m_\Delta^{ii}$ and the offset $y_{\Delta 0}^{ii}$, and thus the following constants for the position assignment:

$$k_x = \frac{m_x}{m_x^2 + m_y^2} \quad (19)$$

$$k_y = \frac{m_y}{m_x^2 + m_y^2} \quad (20)$$

$$k_0 = -\frac{m_x Y_{0x} + m_y Y_{0y}}{m_x^2 + m_y^2} - \theta_i \quad (21)$$

$$\hat{\theta} = k_x \tilde{Y}_{\Delta x} + k_y \tilde{Y}_{\Delta y} + k_0 + \theta_i. \quad (22)$$

In some embodiments, only position assignment parameters for one sector of the stator-fixed electric current coordinate system are stored, and the position assignment in the remaining sectors take place by repeating the one sector.

For example, if it is assumed that the magnetic behavior of the machine is phase-symmetric, which with the exception of the stator-fixed anisotropic harmonics applies very well to practically all polyphase machines, the data volume to be stored may be further reduced by a factor of six.

All depictions of examples in this description have been phase-symmetric, which in FIG. 7, among others, results in the SFC trajectories in the right portion of FIG. 7 once again being superimposed after one-sixth of an electrical revolution, and thus results in only six SFC trajectories being discernible at that location. Consequently, only one-sixth of an electrical revolution needs to be stored, after which the pattern then repeats.

The calculation and storage of all coefficients $k_x$, $k_y$, and $k_0$ take place, for example, as a function of the electric current absolute value $i_\parallel = |i_s^s|$ and the electric current angle $\theta_i$, but only for the electric current angular range $\theta_i = [0, \pi/3)$. During operation, these cropped data are then, for example, mapped onto the entire electric current angular range $\theta_i = [-\pi, \pi)$ by means of the modulo function:

$$\theta_{i\%} = \mod\left(\theta_i, \frac{\pi}{3}\right) \quad (23)$$

$$\hat{\theta} = k_x(i_\parallel, \theta_{i\%}) \tilde{Y}_{\Delta x} + k_y(i_\parallel, \theta_{i\%}) \tilde{Y}_{\Delta y} + k_0(i_\parallel, \theta_{i\%}) + \theta_i. \quad (24)$$

These storage and evaluation equations (23) and (24), despite one-sixth the data, are completely correct when the magnetic behavior is phase-symmetric. As mentioned above, some machines show exactly one relevant asymmetrical component: the zeroth harmonic or stator-fixed anisotropy. It represents the average value of the anisotropy vector $y_\Delta^s$, over the rotor position for a given RFC:

$$y_{h0}^s(i_s^r) = \frac{1}{2\pi} \int_{\theta=0}^{2\pi} y_\Delta^s(\theta, i_s^r) d\theta \Big|_{i_s^r = const.} \quad (25)$$

i.e., the center of gravity of the RFC anisotropy trajectory. In the previous illustrations this was always zero, but in practice is sometimes different. The result is then a two-period oscillation in the estimation error $e_\theta = \hat{\theta} - \theta$ when $y_{h0}^s$ is not correspondingly compensated for.

However, compensation for the stator-fixed anisotropy is also possible as an expansion to a phase symmetry assumption. Thus, in some embodiments, after measuring the two anisotropy values of the inductance or admittance in stator-fixed coordinates, a stored vectorial shift value is subtracted. For this purpose, initially $y_{h0}{}^s$ is determined according to equation (25), and is subsequently subtracted in each case prior to the transformation to double current coordinates, for the modeling equations (19), (20), and (21) as well as during operation equation (24):

$$y_\Delta^{ii} = \begin{bmatrix} \cos(2\theta_i) & \sin(2\theta_i) \\ -\sin(2\theta_i) & \cos(2\theta_i) \end{bmatrix} (y_\Delta^s - y_{h0}^s). \tag{26}$$

This compensation may be carried out constantly or as a function of the electric current absolute value, the former generally being sufficient when $y_{h0}{}^s$ has been determined in the case without load.

The rotor design and the setpoint electric current trajectories (MTPA, etc.) are generally mirror-symmetrical about the d axis. Therefore, for example load-symmetrical magnetic behavior (in a specific manner) may be assumed. This allows an additional data reduction by a factor of two. In some embodiments having slight parasitic effects, this optional measure does not result in a significant estimation error, so that it may be provided for the purpose of data reduction by a factor of two.

In this example approach, for example the coefficients $k_x$, $k_y$, and $k_0$ are determined only for positive loads, and during operation are utilized for the position estimate for positive loads according to equation (24). Under the assumption of load symmetry, for negative loads the following law for the position estimate may then be used:

$$\theta_{i\%} = \mod\left(-\theta_i, \frac{\pi}{3}\right) \tag{27}$$

$$\hat{\theta} = -k_x(i_{\|}, \theta_{i\%})\tilde{Y}_{\Delta x} + k_y(i_{\|}, \theta_{i\%})\tilde{Y}_{\Delta y} - k_0(i_{\|}, \theta_{i\%}) + \theta_i. \tag{28}$$

In some embodiments, the position assignment rule for negative torques is thus derived from the parameters in exactly the same way as for positive torques, with the algebraic sign of the first anisotropic coefficients, the isotropic coefficient, and the offset coefficient being negated in each case.

In some embodiments, the inductance or admittance is described by three values, one of which describes its isotropic component, and two of which describe its stator-fixed anisotropic component.

Figure 8:
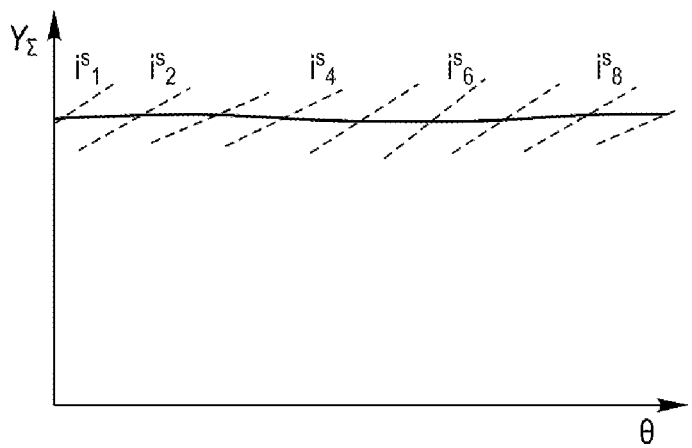
FIG. 8 shows the pattern in the isotropic component under RFC (rotor-frame fixed electric current) and SFC conditions, with load.
Figure 9:
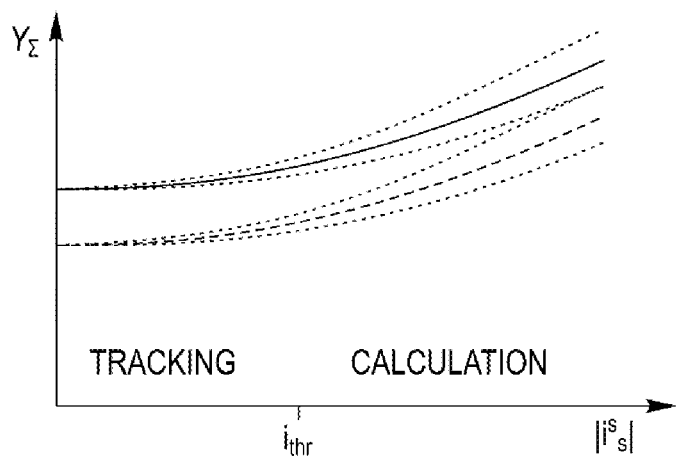
FIG. 9 shows the pattern of the isotropic component as a function of the electric current absolute value for various machine temperatures.

As mentioned above, the isotropic component $Y_\Sigma$, under a conventional consideration with rotor-fixed electric current (RFC), shows very little position dependency. In FIG. 8, a solid line shows an example of an RFC pattern of $Y_\Sigma$, with its offset and the typically weak variation as a function of the rotor position, which cannot be used for the position estimate.

In addition, nine examples of $Y_\Sigma$ patterns for various stator-fixed applied electric currents (SFC) are illustrated by dashed lines. Analogously to FIG. 7, the electric currents are in each case rotated by 10° relative to one another, resulting in the patterns that are shifted with respect to one another. For zero electric current, the RFC patterns and the SFC patterns are also identical for the isotropic component. With increasing electric current absolute value, however, the slope of the SFC patterns, i.e., their position dependency, becomes increasingly steeper, and at very high electric currents even delivers the largest information component of all signals. In addition, the SFC patterns of $Y_\Sigma$ around the setpoint working point are even more reliably monotonic (i.e., for even more machines over an even wider operating range) than the SFC trajectories $y_\Delta^{ii}$, as the result of which the stability and the applicability of the embodiments described here may be increased even further.

The isotropic component $Y_\Sigma$, for example in addition to $y_\Delta^{ii}$, is incorporated as a third dimension of the position information and linearized in the setpoint working point:

$$y_{\Delta\Sigma}^{ii} = \begin{bmatrix} Y_{\Delta x} \\ Y_{\Delta y} \\ Y_\Sigma \end{bmatrix} \tag{29}$$

$$\approx \begin{bmatrix} m_x \\ m_y \\ m_\Sigma \end{bmatrix} \theta + \begin{bmatrix} Y_{0x} \\ Y_{0y} \\ Y_{0\Sigma} \end{bmatrix} \tag{30}$$

$$= m_{\Delta\Sigma}^{ii}\theta + Y_{0\Delta\Sigma}^{ii}. \tag{31}$$

In this exemplary embodiment, with this third dimension the coefficients and the equation for the position estimate result in:

$$k_x = \frac{m_x}{m_x^2 + m_y^2 + m_\Sigma^2} \tag{32}$$

$$k_y = \frac{m_y}{m_x^2 + m_y^2 + m_\Sigma^2} \tag{33}$$

$$k_\Sigma = \frac{m_\Sigma}{m_x^2 + m_y^2 + m_\Sigma^2} \tag{34}$$

$$k_0 = -\frac{m_x Y_{0x} + m_y Y_{0y} + m_\Sigma Y_{0\Sigma}}{m_x^2 + m_y^2 + m_\Sigma^2} - \theta_i \tag{35}$$

$$\hat{\theta} = k_x \tilde{Y}_{\Delta x} + k_y \tilde{Y}_{\Delta y} + k_\Sigma \tilde{Y}_\Sigma + k_0 + \theta_i. \tag{36}$$

Under the assumption of load symmetry, for example the following equation for the position estimate for negative loads is valid:

$$\hat{\theta} = -k_x \tilde{Y}_{\Delta x} + k_y \tilde{Y}_{\Delta y} - k_\Sigma \tilde{Y}_\Sigma - k_0 + \theta_i. \tag{37}$$

The assumption of phase symmetry may be applied to $Y_\Sigma$, and thus to $y_{\Delta\Sigma}^{ii}$, in the same way as previously applied to $y_\Delta^{ii}$. However, the transformation into double electric current coordinates as before is applied only to the first two components in $y_{\Delta\Sigma}^{ii}$; $k_\Sigma$ remains unaffected.

Although the position information, the stability, and the applicability are greatly improved by introducing the isotropic component $Y_\Sigma$, the temperature dependency of the position assignment is also increased. Namely, the temperature of the permanent magnets ("PMs") (in/at the rotor) show an influence on the estimation results. When the temperature increases, the PM flux then drops (reversibly, by up to 15%) and reduces the saturation level of the iron. As a result, primarily the isotropic component $Y_\Sigma$, but also the absolute value of the anisotropy $|y_\Delta^s|$, decreases. The orientation of the anisotropy $\angle y_\Delta^s$ is influenced very little, as the result of which conventional methods for rotor position assignment have only a minor temperature dependency. In contrast, methods of bibliography references [23], [24], and [25] have temperature sensitivity that is comparable to the exemplary embodiment described here, incorporate few dimensions of the admittance into the basic approach, and involve methods without temperature tracking. The above description is applicable primarily to machines with surface-mounted PMs since their anisotropy is brought about mainly by saturation. Machines with buried PMs show a lower temperature dependency, and reluctance machines (without PMs) show no relevant temperature dependency.

Two examples of approaches for temperature compensation are described below, the first managing without additional measured data, and the second requiring measured data from a machine having various temperatures. However, all example approaches require multidimensional admittance information, which can be obtained only from linearly independent voltage vectors in the injection pattern. That is, in particular so-called alternating injection is insufficient as a basis.

The temperature has the greatest influence on the isotropic component $Y_\Sigma$, which due to the relationships of vector projection equations (32), (33), (34) under high loads often has the greatest influence on the position assignment. Namely, the temperature changes primarily the offset value of the isotropic component under zero load $Y_{\Sigma i0} = Y_\Sigma$ ($|i_s^s|=0$), whereas from that point on the relative pattern is essentially the same. Thus, FIG. 8 qualitatively illustrates an example of how the patterns of $Y_\Sigma$ as a function of the electric current absolute value for a cold machine (solid-line curve) and a hot machine (dashed-line curve) are merely shifted relative to one another on the setpoint current trajectory. A cold machine is approximately at room temperature, for example, and a hot machine has approximately the temperature, for example, that results during continuous operation under nominal load.

The dotted-line curves show the change in $Y_\Sigma$ when the rotor is rotated left or right while keeping the SFC the same, i.e., show the position information, which at the same time explains why an estimation error occurs with a hot machine when the estimation is made using cold parameters.

Therefore, in some embodiments the isotropic component of the admittance or inductance is used exclusively for the position estimate when the electric current absolute value is large, and for a small electric current absolute value it is used for correcting a variable that contains the value of the isotropic component that is valid for zero electric current.

For small electric current absolute values $|i_s^s|$, the position information in $Y_\Sigma$ is weak, as the result of which the position estimate is based primarily on $y_A^s$. For this reason, in some embodiments temperature-related changes in the magnetic properties of the synchronous machine are compensated for in the position assignment, even without measured data for the temperature dependency, in that it is not the measured isotropic component itself, but, rather, the difference between this measured value and the value of the isotropic component that is tracked for zero electric current, that is incorporated into the position assignment.

For parameter-free temperature compensation, for example in this electric current range $|i_s^s| < i_{thr}$ the influence of the isotropic component $Y_\Sigma$ on the position estimate is artificially turned off; $k_\Sigma = 0$ (estimation using only $y_A^s$), and, for example, the measurement of $Y_\Sigma$, i.e., $\tilde{Y}_\Sigma$, is used to track the offset value $Y_{\Sigma i0}$.

Thus, $Y_{\Sigma i0}$ is a variable which above $|i_s^s| > i_{thr}$ is to be considered in the position estimate equations (35) and (36) as follows, for example:

$$k_0 = -\frac{m_x Y_{0x} + m_y Y_{0y} + m_\Sigma (Y_{0\Sigma} - Y_{\Sigma i0})}{m_x^2 + m_y^2 + m_\Sigma^2} - \theta_i \quad (38)$$

$$\hat{\theta} = k_x \tilde{Y}_{\Delta x} + k_y \tilde{Y}_{\Delta y} + k_\Sigma (\tilde{Y}_\Sigma - Y_{\Sigma i0}) + k_0 + \theta_i. \quad (39)$$

Below list $|i_s^s| < i_{thr}$, $Y_{\Sigma i0}$ is gradually tracked using the following filter law, for example:

$$\frac{dY_{\Sigma i0}}{dt} = \omega_\Sigma (\tilde{Y}_\Sigma - Y_{\Sigma i0}), \quad (40)$$

where $\omega_{93}$ is the filter cutoff frequency. In this simplest form of the tracking equation (40), a rise in the curves within $|i_s^s| < i_{thr}$ is not considered, which for increased threshold values $i_{thr}$ may result in errors in the tracking of $Y_{\Sigma i0}$, and thus, in the estimation of $\hat{\theta}$. These errors may be avoided, for example, when the increase in $Y_\Sigma$ is considered by means of an (offset-free) nth order polynomial in the tracking equation (40):

$$\frac{dY_{\Sigma i0}}{dt} = \omega_\Sigma \left( \tilde{Y}_\Sigma - Y_{\Sigma i0} - \sum_{j=1}^{n} a_j |i_s^s|^j \right) \quad (41)$$

The coefficients $a_j$ weight the particular power. Within $|i_s^s| < i_{thr}$, the second power alone generally describes the pattern very well, for which reason the following tracking law, which is reduced and thus relatively economical with respect to computing time, is generally sufficient:

$$\frac{dY_{\Sigma i0}}{dt} = \omega_\Sigma (\tilde{Y}_\Sigma - Y_{\Sigma i0} - a_2 |i_s^s|^2). \quad (42)$$

For machines with complex anisotropic behavior, having anisotropy trajectories such as in the right portion of FIG. 1, beyond $Y_\Sigma$ the temperature dependency of the SFC trajectories of $y_A^{ii}$ may also be so great that a parameter-free compensation is not sufficient, and excessively large estimation errors, even instabilities, occur.

For this reason, in some embodiments various position assignment parameters, valid for various machine temperatures, are derived from multiple pieces of measured data that are obtained at various machine temperatures. These embodiments are used, for example, for types of machines with complex anisotropic behavior.

Thus, in one exemplary embodiment the position dependency may be additionally determined at a high machine temperature, and corresponding coefficient fields $k_{xh}$, $k_{yh}$, $k_{\Sigma h}$ and $k_{0h}$ may be stored as a function of the electric current absolute value $i_{\|}$ and electric current angle $\theta_i$. Because the position assignment rule (either of equations (37) or (39)) is completely linear, the cold coefficients ($kx_c$) and the hot coefficients ($kx_h$) may be easily linearly interpolated:

$$k_x = k_{xc} + v_h (k_{xh} - k_{xc}), \quad (43)$$

resulting in a correct position assignment for a cold machine ($v_h=0$), for a hot machine ($v_h=1$), and also in the intermediate range ($0 < v_h < 1$).

There are, for example, two information sources for tracking the weighting factor $v_h$ online with changing temperatures, which are described in the following two subsections, and which may be used either separately or in combination.

In some embodiments, temperature-related changes in the magnetic properties of the synchronous machine are compensated for in the position assignment by using the tracked value of the isotropic component, valid for zero electric current, in order to adapt the weighting between position assignment parameters that are valid for various machine temperatures.

Portions of the cold data and of the hot data are the respective zero electric current offset values of the isotropic component $Y_{\Sigma i0c}$ (cold) and $Y_{\Sigma i0h}$ (hot), which should be much different due to the reversible decrease in the PM flux. By use of these boundary parameters and one of the tracking law equations (40), (41), (42) for measuring $Y_{\Sigma i0}$, the particular ratio of the instantaneous operating state to which data may be assigned can be determined:

$$v_h = \frac{Y_{\Sigma i0} - Y_{\Sigma i0c}}{Y_{\Sigma i0h} - Y_{\Sigma i0c}}. \tag{44}$$

Since $Y_{\Sigma i0}$ delivers a relatively strong signal, these embodiments allow a relatively accurate assignment of the associated data set. However, the tracking of $Y_{\Sigma i0}$ and thus, the updating of $v_h$, functions only in the lower electric current range $|i_s^s| < i_{thr}$. In addition, for machines with complex behavior, the threshold value $i_{thr}$ is selected to be low, for example, to allow $Y_\Sigma$ to be used as early as possible for the position estimate.

In some embodiments, the temperature-related changes in the magnetic properties of the synchronous machine are compensated for in the position assignment by utilizing a shift of the measured inductance or admittance that is orthogonal with respect to the direction of the position dependency of the inductance or admittance, in order to adapt the weighting between position assignment parameters that are valid for various machine temperatures.

The calculation of the weighting factor $v_h$ by means of orthogonal evaluation also functions above $|i_s^s| < i_{thr}$, and thus completes the tracking area on the entire setpoint electric current range. However, this example approach delivers a lower signal strength than the isotropic component and may thus tend to result in estimation errors. Therefore, this approach should only be used, for example, when the lower electric current range $|i_s^s| < i_{thr}$ has not been passed through for an extended time period.

Figure 10:
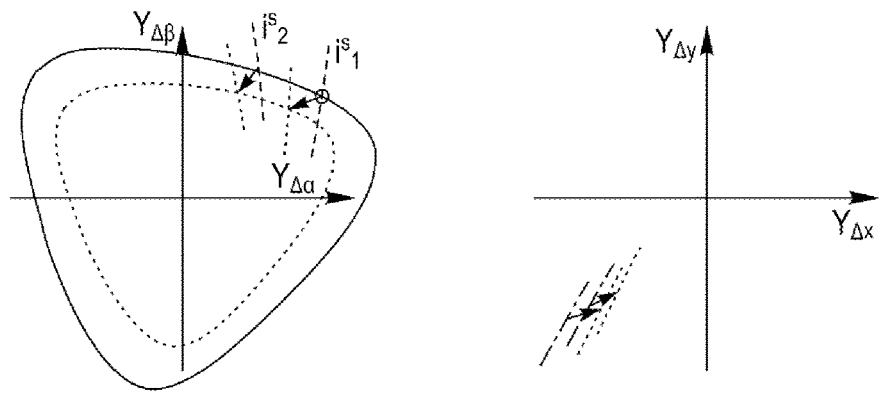
FIG. 10 shows the influence of the permanent magnet (PM) temperature on the RFC and SFC trajectories.

The left portion of FIG. 10 illustrates with dotted lines an example of how the RFC trajectory and two SFC trajectories shift when the machine has been measured when it is hot, not cold.

The arrows show the specific shift vector shift vector $\Delta y_A^s$ in the setpoint working point, which has a component that is parallel to the rotor position dependency (dashed lines), and an orthogonal component. The same relationship is also found on the right side of FIG. 10, illustrated once again in double electric current coordinates, where the directions of the shift vectors $\Delta y_A^{ii}$ are similar to one another, as expected.

The component $y_{\Delta\Sigma\|}^{ii}$ parallel to the position dependency is precisely the vectorial component that results in an estimation error when there is a change in temperature. It is calculated, for example, by projection as follows:

$$\Delta y_{\Delta\Sigma\|}^{ii} = \frac{\Delta y_{\Delta\Sigma}^{ii\ T} m_{\Delta\Sigma}^{ii}}{m_{\Delta\Sigma}^{ii\ T} m_{\Delta\Sigma}^{ii}} m_{\Delta\Sigma}^{ii}. \tag{45}$$

The orthogonal component $\Delta y_{\Delta\Sigma\perp}^{ii}$ is situated, for example, exactly in the position information-free direction (for three dimensions, these possible directions span a plane) in which the greatest temperature dependency results. It is calculated, for example, by vectorially subtracting the contained position dependency $y_{\Delta\Sigma\|}^{ii}$ from the actual temperature dependency $\Delta y_{\Delta\Sigma}^{ii}$:

$$\Delta y_{\Delta\Sigma\perp}^{ii} = \Delta y_{\Delta\Sigma}^{ii} - \Delta y_{\Delta\Sigma\|}^{ii}. \tag{46}$$

If admittance values $\tilde{y}_{\Delta\Sigma}^{ii}$ are now continuously measured during operation in a certain direction in addition to the SFC trajectory, the temperature weighting factor $v_h$, for example, may be derived from the orthogonal component of the deviation. The calculation takes place by means of projection:

$$v_h = \frac{(\tilde{y}_{\Delta\Sigma}^{ii} - Y_{0\Delta\Sigma}^{ii})^T \Delta y_{\Delta\Sigma\perp}^{ii}}{\Delta y_{\Delta\Sigma\perp}^{ii\ T} \Delta y_{\Delta\Sigma\perp}^{ii}}. \tag{47}$$

Due to the typically very slow change in temperature of the rotor, for example filtering is additionally carried out per equation (47) using a filter with low pass behavior and a correspondingly very low bandwidth. For example, the bandwidth is additionally scaled using the square value of the instantaneous temperature information $(\Delta y_{\Delta\Sigma\perp}^{ii\ T} \Delta y_{\Delta\Sigma\perp}^{ii})$ to influence the tracking to a lesser degree in operating points with little temperature information than in points containing much information.

In other respects, for all approaches the actual temperature of the machine is not important. The methods merely determine that the machine passes from one magnetic behavior to another and use a correspondingly different assignment rule between the admittance/inductance (i.e., magnetic behavior) and the rotor position. This very direct type of compensation thus dispenses entirely with the assumption regarding the relationship between temperature and magnetic behavior, and also with the problems and obstacles of a PM temperature determination (PMs rotate with the rotor, only phase temperature measurement is moderately prevalent, and temperature models are inaccurate and susceptible to interference).

Figure 11:
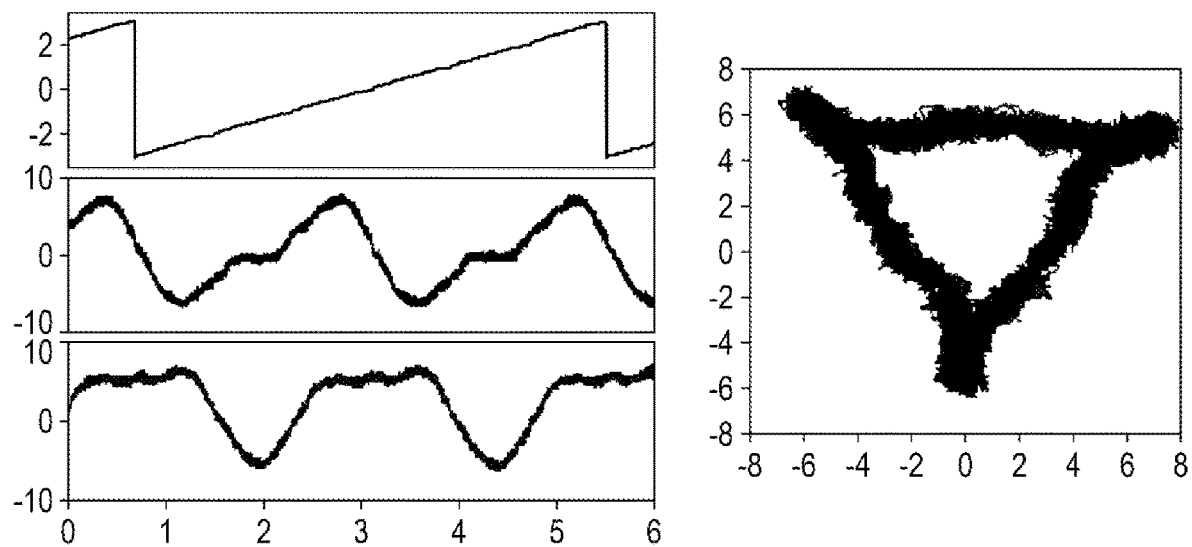
FIG. 11 shows a position estimate (top left-side graph) and the components of the anisotropy, illustrated in each case as a function of time in seconds (left center and lower left graphs), and as a locus curve (right-side graph)

All of the following measuring results were obtained using the same very critical machine, which with conventional methods is stably controllable only up to less than one-half nominal load. FIG. 11 shows the locus curve of the anisotropy vector $\tilde{y}_A^s$ and the time curves of its components at one-half nominal load, which stagnate in the vertices and return back into themselves. These patterns are not unambiguously assignable using conventional methods, and large estimation errors and a significantly fluctuating pattern of the position estimate $\hat{\theta}$ in the corners would result.

In contrast, the position estimate illustrated in FIG. 11 shows a linear behavior of $\hat{\theta}$ that fits the actual pattern, so that the q-current controlled on this basis constantly generates the setpoint torque.

Figure 12:
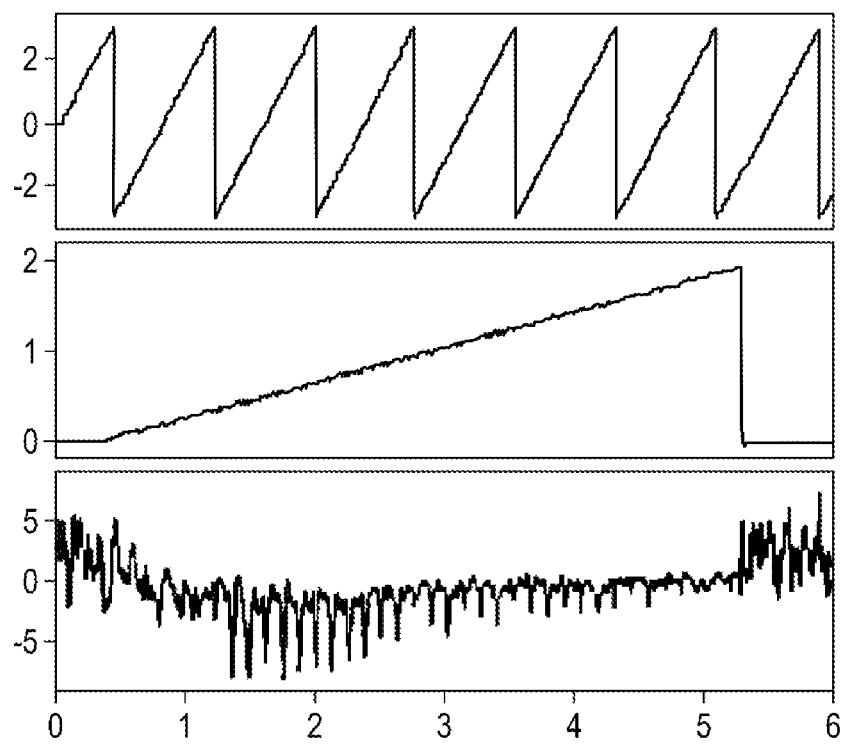
FIG. 12 shows a position estimate (top graph), a q-current ramp based on nominal electric current (center graph), and estimation error (bottom graph) as a function of time in seconds.

Above one-half nominal load, conventional methods for this machine become unstable due to the reasons described in bibliography reference [22]. In contrast, FIG. 12 shows that the method described here allows a stable position estimate under all loads.

With the exception of brief exceedances, the estimation error remains in a band of ±5° (electrical position), and thus becomes increasingly smaller (more accurate) with increasing load.

Figure 13:
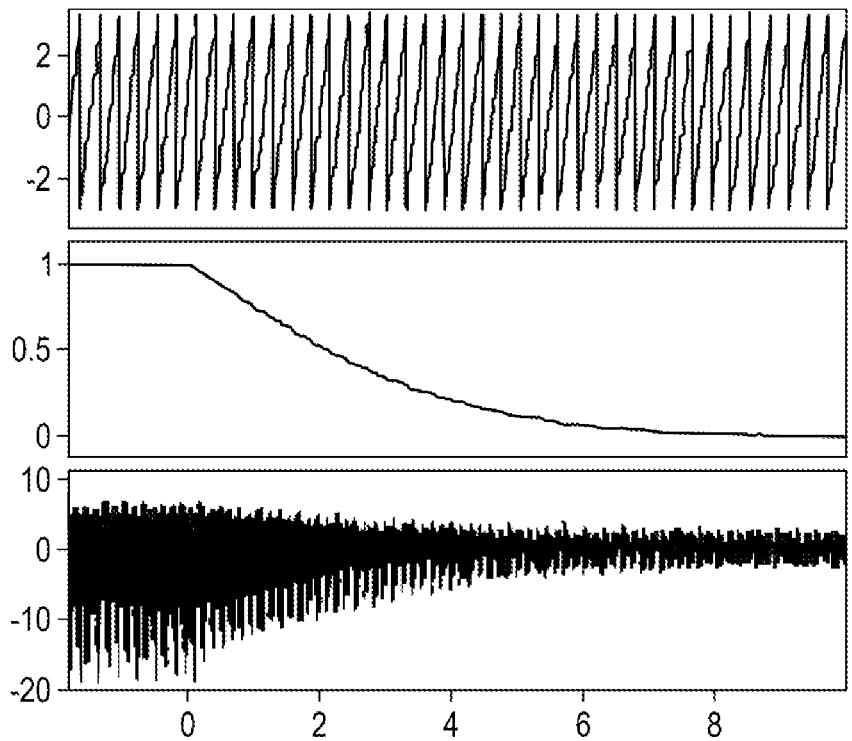
FIG. 13 shows the estimated rotor position (top graph), weighting ratio (center graph), and estimation error (bottom graph) as a function of time in seconds.

FIG. 13 shows the process of temperature tracking according to the exemplary embodiments mentioned above, using cold and hot position assignment data. At the start, the cold machine is controlled only by means of hot data ($v_h=1$), wherein estimation errors of just under 20° occur, and the position assignment is just prior to the instability.

The temperature tracking is activated at time zero, as the result of which the weighting ratio between the cold and the hot position assignment data is corrected to $v_h \approx 0$ within a few seconds. As a result, the estimation error drops to below an error band of ±2.5°, which shows that, in contrast to the initial state, the actual magnetic behavior of the machine has been correctly identified and the position assignment has been correspondingly adapted. Thus, even this critical machine can be stably and accurately controlled over the entire temperature range without a position sensor.

Further aspects relate to:

(i) A device for controlling and regulating a polyphase machine, comprising a stator and a rotor, having an apparatus for detecting the number of phase currents, and having a controller for controlling the PWM (pulse width modulation) converter, which is configured and designed to carry out the method as described above; and (ii) A synchronous machine comprising a stator and a rotor with or without permanent magnets, with a device for control and/or regulation as described in item (i).

The present established highly efficient control of electric motors and generators (both machines) presumes that the rotor angle is known at any point in time, i.e., is generally measured. Without this knowledge, only control methods having much less efficiency can be used. The measurement takes place during operation by means of a sensor that is mounted at the rotor shaft, the so-called rotor position sensor, or sensor for short.

Sensors have a number of disadvantages such as increased system costs, reduced robustness, increased likelihood of failure, and fairly large space requirements, which has prompted interest by the major industrial sector in obtaining the angle signal without using a sensor, and to use it for efficient control.

Methods that allow this are referred to as "sensor-less" control, and are divided into two classes:

1. Fundamental wave methods evaluate the voltage induced by movement; at average and high rotational speeds they provide very good signal properties, but they fail in the lower rotational speed range, in particular at a standstill.

2. Anisotropy-based methods evaluate the position dependency of the inductance of the machine, for which reason no rotational speed is necessary; however, they have numerous problems and difficulties, which explains why many applications thus far require a position sensor (with its drawbacks).

One of the most difficult problems with anisotropy-based methods is their load limit. When a certain torque threshold is exceeded, the unambiguity of the position information is lost for conventional anisotropy-based methods, as the result of which the control loop becomes unstable. The level of the torque threshold depends on the machine design, and for recent machines (having concentrated windings) may be greatly below nominal load.

The method described here relates to one of two components of anisotropy-based methods, namely, the rotor position assignment. The rotor position assignment is derived and implemented in a fairly complex manner, as the result of which the unambiguity under load is not lost, and the control loop generally is and remains stable.

However, this unambiguous rotor position assignment is more heavily dependent on the rotor temperature than with conventional methods. To achieve stable and sufficiently accurate control over the entire temperature range, according to certain exemplary embodiments the method is supplemented with temperature tracking. Temperature tracking presumes that at least three-dimensional admittance information is present, which can be measured only by means of linearly independent injection pulses.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

BIBLIOGRAPHY

[1] M. Schroedl, "Detection of the rotor position of a permanent magnet synchronous machine at standstill," *IEEE Conf. ICEM*, pp. 51-56, 1988.

[2] P. L. Jansen and R. D. Lorenz, "Transducerless position and velocity estimation in induction and salient ac machines," *IEEE Trans. On Industrial Applications*, vol. 31, pp. 240-247, 1995.

[3] M. J. Corley and R. D. Lorenz, "Rotor position and velocity estimation for a salient-pole permanent magnet synchronous machine at standstill and high speeds," *IEEE Trans. on Industrial Applications*, vol. 34, pp. 784-789, 1998.

[4] D. Paulus, P. Landsmann, and R. Kennel, "Sensorless field-oriented control for permanent magnet synchronous machines with an arbitrary injection scheme and direct angle calculation," *IEEE Conf. SLED*, pp. 41-46, 2011.

[5] P. Landsmann, German patent application publication DE 10 2015 217 986 A1 (2015).

[6] D. Paulus, P. Landsmann, S. Kuehl, and R. Kennel, "Arbitrary injection for permanent magnet synchronous machines with multiple saliencies," in *IEEE Conf. ECCE*, Denver, 2013.

[7] T. Frenzke, "Impacts of cross-saturation on sensorless control of surface permanent magnet synchronous motors," in *Conf EPE*, Dresden, 2005.

[8] D. Reigosa, P. Garcia, D. Raca, F. Briz, and R. D. Lorenz, "Measurement and Adaptive Decoupling of Cross-Saturation Effects and Secondary Saliencies in Sensorless-Controlled IPM Synchronous Machines," in *IEEE Industry Applications Annual Meeting*, New Orleans, 2007.

[9] S. Paulus and G. Goetting, "Self-sensing control of permanent-magnet synchronous machines with reluctance and saturation effects using high-frequency signal injection," in *APEC*, Long Beach, 2013.

[10] M. Schrödl and R. Ensbacher, "Process and circuits for determining machine-related electro-magnetic and mechanical state variables on electrodynamic induction machines supplied via converters." WO 1992-019038 A1 (counterpart U.S. Pat. No. 5,796,235) (1992).

[11] P. L. Jansen and R. D. Lorenz, "Method and apparatus for transducerless flux, position and velocity estimation in drives for ac machines," WO 1995-017780 A1 (counterpart U.S. Pat. No. 5,559,419) (1995).

[12] M. M. Wogari, K. Ide, and M. Sawamura, "Electric motor pole position sensing method, pole position sensing apparatus, and electric motor control apparatus using the same." WO 2003-015256 A (counterpart U.S. Pat. No. 7,190,130) (2003).

[13] N. Bianchi and S. Bolognani, "Influence of rotor geometry of an interior PM motor on sensorless control feasibility," in *IEEE Conf IAS Annual Meeting*. 2005.

[14] P. Guglielmi, M. Pastorelli, and A. Vagati, "Cross-Saturation Effects in IPM Motors and Related Impact on Sensorless Control," *IEEE Trans. on Industry Applications*, pp. 1516-1522, November-December 2006.

[15] O. C. Ferreira and R. Kennel, "Encoderless Control of Industrial Servo Drives," in *EPE/PEMC*, Portoroz, 2006.

[16] P. Balazovic and R. Filka, "Motor controller for determining a position of a rotor of an AC motor, AC motor system, and method of determining a position of a rotor of an AC motor," U.S. Pat. No. 8,217,605 (2007).

[17] J. Liu, M. M. Harbaugh, T. A. Nondahl, P. B. Schmidt, and S. Royak, "Method and apparatus for automatically identifying electrical parameters in a sensor-less PMSM," U.S. Pat. No. 8,228,013 (2008).

[18] C. Y. Yu J. Tamura, D. Reigosa, and R. D. Lorenz, "Position self-sensing evaluation of a FI-IPMSM based on high frequency signal injection methods," in *IEEE Conf. ECCE*, Phoenix, 2011.

[19] L. Chen, G. Götting, S. Dietrich, and I. Hahn, "Self-Sensing Control of Permanent-Magnet Synchronous Machines with Multiple Saliencies Using Pulse-Voltage-Injection," *IEEE Trans. on Industry Applications*, pp. 3480-3491, July-August 2016.

[20] T. S. Slininger and R. D. Lorenz, "Enhancing self-sensing estimation accuracy via negative sequence current image registration, with evaluation on a low saliency ratio machine," in *IEEE Conf. SLED*, Catania, 2017.

[21] B. Meier, M. Oettmeier, J. O. Fiedlere, and T. Bertram, "Enabling sensorless control of a permanent magnet synchronous machine in the low speed region using saturation," in *IEEE Conf. IECON*, Florence, 2016.

[22] W. Hammel, P. Landsmann, and R. M. Kennel, "Operating point dependent anisotropies and assessment for position-sensorless control," in *EPE/ECCE Europe*, Karlsruhe, 2016.

[23] A. K. Jebai, F. Malrait, P. Martin, and P. rouchon, "Sensorless position estimation of Permanent-Magnet Synchronous Motors using a nonlinear magnetic saturation model," in *IEEE Conf. ICEM*, Marseille, 2012.

[24] A. Jebai, F. Malrait, P. Martin, and R. Rouchon, "Control method implemented in a power converter and intended for identifying parameters linked to the magnetic saturation of an electric motor" U.S. Pat. No. 9,197,152 (2012).

[25] M. Roetzer, U. Vollmer, L. Chen, and R. Kennel, "Anisotropy-based position estimation approach for symmetrical dual three-phase permanent magnet synchronous machines," in *IEEE Conf. SLED*, Catania, 2017.

What is claimed is:

1. A method for assigning an inductance or an admittance to a rotor position of a synchronous machine having a stator and a rotor with or without permanent magnets, the method comprising:
   actuating the synchronous machine via clocked terminal voltages;
   measuring electric current of the synchronous machine responsive to the synchronous machine being actuated via the clocked terminal voltages;
   determining an inductance or an admittance from each pair of clocked terminal voltage and measured current response; and
   using a pattern of the inductance or the admittance as a function of rotation of the rotor, under a boundary condition of an at least two-dimensional electric current vector that is unchanged in coordinates of the stator, to assign respective inductances or admittances to positions of the rotor.

2. The method of claim 1 further comprising:
storing multiple patterns of the inductance or the admittance as a function of rotation of the rotor in a model for various stator-fixed electric current values in each case, from which an instantaneously valid pattern or parameter set is selected, according to the measured current response, by which a position value of the rotor is assigned to the inductance or admittance.

3. The method of claim 1 wherein:
each inductance or admittance assigned to a position of the rotor is described by three values, one of the three values describes an isotropic component of the inductance or admittance and the other two of the three values describe a stator-fixed anisotropic component of the inductance or admittance.

4. The method of claim 3 further comprising:
after measuring two anisotropy values of the inductance or admittance in stator-fixed coordinates, subtracting a stored vectorial shift value.

5. The method of claim 3 further comprising:
prior to each further use of the stator-fixed coordinate system, transforming the two anisotropy values of the inductance or admittance into a coordinate system aligned with a double electric current angle.

6. The method of claim 3 wherein:
the isotropic component of the admittance or inductance is used exclusively for the position estimate when the electric current absolute value is relatively large, and for a small electric current absolute value it is used for correcting a variable that contains the value of the isotropic component that is valid for zero electric current.

7. The method of claim 6 wherein:
temperature-related changes in magnetic properties of the synchronous machine are compensated for in the position assignment, even without measured data for the temperature dependency, in that it is not the measured isotropic component itself, but, rather, the difference between this measured value and the value of the isotropic component that is tracked for zero current, that is incorporated into the position assignment.

8. The method of claim 7 wherein:
the temperature-related changes in the magnetic properties of the synchronous machine are compensated for in the position assignment by using the tracked value of the isotropic component, valid for zero current, to adapt the weighting between position assignment parameters that are valid for various machine temperatures.

9. The method of claim 8 wherein:
the position assignment parameters, valid for various machine temperatures, are derived from multiple pieces of measured data that are obtained at various machine temperatures.

10. The method of claim 1 further comprising:
calculating rotor position using measured inductance or admittance, measured current vector in stator coordinates, and stored position assignment parameters, wherein an estimated rotor position is neither directly nor indirectly returned for rotor position assignment.

11. The method of claim 1 further comprising:
for assigning the measured inductance or admittance to the rotor position, using a linear rule which corresponds to a projection of the measured value onto the actual rotor position dependency of the inductance or admittance, which is linearized in the setpoint current working point.

12. The method of claim 11 wherein:
a projection of the measured value onto the tangent of the actual rotor position dependency of the inductance or admittance corresponds to the linear rule.

13. The method of claim 11 wherein:
the position assignment rule for negative torques is derived from the parameters in a same way as for positive torques, with the algebraic sign of the first anisotropic coefficients, the isotropic coefficient, and the offset coefficient being negated in each case.

14. The method of claim 1 further comprising:
storing position assignment parameters as a function of an electric current absolute value and an electric current angle.

15. The method of claim 14 wherein
only position assignment parameters for one sector of the stator-fixed current coordinate system are stored, and the position assignment in the remaining sectors takes place by repeating the one sector.

16. The method of claim 1 wherein:
the temperature-related changes in the magnetic properties of the synchronous machine are compensated for in the position assignment by utilizing a shift of the measured inductance or admittance that is orthogonal with respect to the direction of the position dependency of the inductance or admittance, to adapt the weighting between position assignment parameters that are valid for various machine temperatures.

17. A device for controlling and regulating a polyphase machine, comprising a stator and a rotor, the device comprising a controllable PWM converter for outputting clocked terminal voltages, an apparatus for detecting the number of phase currents, and a controller for controlling the PWM converter, wherein the controller is configured to perform the method of claim 1.

18. A synchronous machine comprising a stator and a rotor with or without permanent magnets, comprising the device of claim 17.

* * * * *